3,009,842
METHOD OF AND MATERIAL FOR APPLYING CHROMATE CONVERSION COATINGS ON ALUMINUM

Lester Steinbrecher, Philadelphia, Pa., assignor to Amchem Products, Inc., Ambler, Pa., a corporation of Delaware
No Drawing. Filed Mar. 21, 1960, Ser. No. 16,204
6 Claims. (Cl. 148—62)

This invention relates to the art of coating aluminum and is particularly concerned with the production of chromate conversion coatings on the surface of aluminum, which coatings are highly corrosion resistant, decorative per se as well as valuable as a base for the subsequent application of a siccative finish if such be desired.

The invention involves a method of coating aluminum as well as a material for use in the method and it can be employed not only with aluminum per se but also with alloys thereof in which aluminum is the principal or predominant ingredient and in the following disclosure as well as in the appended claims the word "aluminum" is intended to be construed as including such alloys.

Before stating the objects of the invention or describing it in detail it is desired to point out that highly corrosion resistant coatings may be produced on aluminum surfaces by treating the surfaces with aqueous acid solutions containing fluorine bearing compounds and hexavalent chromium ions as their principal and essential coating producing ingredients. It is known also that many of these coatings have definite decorative value and also that they provide an excellent base for the subsequent application of siccative finishes. Typical examples familiar to the art are described in U.S. Patents Nos. 2,276,353; 2,507,956; 2,843,513; 2,851,385; 2,859,144 and 2,868,679.

It is also well known to the art at the present time that certain qualities can be introduced into coatings of the type referred to above, especially insofar as decorative value and appearance are concerned, if the treating solutions include also, as an addition agent, some soluble ferricyanide salt and typical examples of this latter are found in U.S. Patents Nos. 2,796,370 and 2,796,371. Generally speaking, coatings produced by these various prior art processes range in color from clear, through light yellow and golden to brown depending upon the particular composition of the solutions and the operating conditions employed.

With the foregoing in mind it can be stated that the principal object of the present invention is to provide a novel process and composition for use in obtaining highly corrosion resistant coatings on aluminum as well as coatings which are highly decorative per se and which may range in color from light yellow and golden to blue and this without regard to whether or not the solutions contain ferricyanide ions.

My invention resides in the discovery that highly corrosion resistant and decorative chromate conversion coatings can be applied to aluminum surfaces if there be added to the treating or coating solutions of the type described above a complex oxymolybdenum compound selected from the class consisting of phospho and silico heteropolymolybdic acids and soluble salts thereof. In this connection the term "soluble salts" is intended to include the alkali metal salts which are soluble in the hexavalent chromium-fluoride solutions referred to.

Examples of the complex heteropolymolybdenum compounds which have been found to be suitable for use in the present invention are:

Phospho-12-molybdic acid $[H_3(PMo_{12}O_{40})]$,
Sodium phospho-12-molybdate $[Na_3(PMo_{12}O_{40})]$,
Sodium 2-phospho-18-molybdate $[Na_6(PMo_{18}O_6')]$,
Sodium 2-phosphorous (III)-12-molybdate
$[Na_3(P_2Mo_{12}O_{41})]$, and
Sodium silico-12-molybdate $[Na-(SiMo_{12}O_{40})]$ and
Silico-12-molybdic acid $[H_4(SiMo_{12}O_{40})]$.

Molybdic acid and the alkali metal or other simple salts thereof are not suitable for use in the process of this invention, inasmuch as these compounds fail to provide the desired corrosion resistant coatings on aluminum surfaces when employed in the solutions of the types described.

Depending upon the amount of the complex heteropolymolybdic compound employed it is possible to obtain highly corrosion resistant coatings on aluminum surfaces which coatings, as noted above, will range in color from yellow or golden to blue. Use of a low amount of molybdenum (calculated as Mo) in the form of a complex molybdenum compound, for example from about 0.04 to about 2 grams/liter (weight/volume) of coating solution produces uniformly golden colored corrosion resistant coatings of high decorative value. Conversely, when the amount of molybdenum (calculated as Mo) which is added in the form of the complex molybdenum compound is in the range of from about 3.5 to about 6 grams/liter of treating solution the resulting coating becomes progressively bluer in color with increased molybdenum content while still possessing the requisite corrosion resistance.

Between the two ranges of molybdenum content given above there is an area extending from 2 to 3.5 grams/liter which can be described as a transitional range so far as the color is concerned. For instance, I have noted varying shades which progress from golden to blue within this range so that while the esthetic or decorative appeal is of a somewhat lower order for coatings obtained using 2 to 3.5 grams/liter of Mo, the corrosion resistance is of the same excellent quality as obtained within the other ranges discussed above.

In general, the concentration of molybdenum (calculated as Mo) which may be used with my improved coating solutions has been found to range from trace quantities to as much as saturation of the particular salt employed. The quantity, therefore, is not of the essence of the invention although the ranges referred to are cited because, by employing them, certain specific results may be obtained. However, where the final color of the treated article is not a controlling factor as, for example, where a siccative finish coat is to be applied over the chromate conversion coating, it has been found that optimum corrosion protective coatings are obtained when the amount of molybdenum (calculated as Mo) lies within the range of about 0.06 to 3 grams/liter so that this latter range is preferred where corrosion resistance only is to be considered.

The following formula is typical of the coating solutions which are presently known to the art, but it is listed by way of example only and is in no way intended to be construed as a limitation on the invention.

FORMULA I

| | Grams |
|---|---|
| $CrO_3$ | 6 |
| $NaBF_4$ | 15 |
| $K_3Fe(CN)_6$ | 2.5 |
| Water, to make 1 liter. | |

The bath of the foregoing formula has a pH of between 1.5 and 1.7 and is representative of solutions which are highly useful in the production of uniformly golden colored and corrosion resistant coatings on aluminum surfaces as taught by the prior art.

Clean aluminum panels (alloy 24S) were immersed in this solution for a 3-minute period at a temperature of 75° F. The treated panels were then exposed to a standard salt fog (20% sodium chloride ASTM salt fog cabinet) for a 500-hour period. After this exposure time the panels were found to be completely acceptable with no evidence of corrosion failure.

A coating solution similar to Formula I was prepared wherein the ferricyanide was replaced with a similar amount (weight/volume) of sodium phospho-12-molybdate in accordance with the present invention.

FORMULA II

| | Grams |
|---|---|
| $CrO_3$ | 6 |
| $NaBF_4$ | 15 |
| $Na_3(PMo_{12}O_{40})$ | 2.5 |
| Water, to make 1 liter. | |

Aluminum 24S alloy panels were coated in this solution for 3 minutes at 75° F. The coated panels, which were uniformly golden in color, were exposed to the salt fog test described above for a 500-hour test period. Upon completion of this period the panels were examined and found to be completely free of corrosion failure.

A series of 11 additional formulations were prepared based on the use of 5 grams of chromic acid and 1 gram of hydrofluoric acid per liter of solution, and also containing from 0.1 to 8.0 grams/liter of phospho-12-molybdic acid. Panels of aluminum 24S alloy were processed in each formulation for a 3-minute period at 75° F. and then subjected to the salt fog test mentioned above. Results of these experiments are summarized in the following table.

Table 1

| Formulation No. | Grams/liter $H_3(PMo_{12}O_{40})$ | Corrosion results after 500 hours in salt fog test |
|---|---|---|
| III | 0.1 | Completely acceptable. |
| IV | 0.2 | Do. |
| V | 0.5 | Do. |
| VI | 1.0 | Do. |
| VII | 2.0 | Do. |
| VIII | 3.0 | Do. |
| IX | 4.0 | Do. |
| X | 5.0 | Do. |
| XI | 6.0 | Do. |
| XII | 7.0 | Do. |
| XIII | 8.0 | Do. |

While the results listed above show that the heteropolymolybdic acids and water soluble salts thereof may be used in lieu of the ferricyanide ion heretofore employed in this art, yet, as previously stated, these complex molybdic compounds may also be used in conjunction with the ferricyanide ion already familiar to the art. When so employed it has been found convenient to substitute a portion of the weight of ferricyanide salt with an equal weight of the molybdenum compound chosen to go with it.

The following examples are offered as illustrations of this latter embodiment of the present invention.

FORMULA XIV

| | Grams |
|---|---|
| $CrO_3$ | 6 |
| $H_2SiF_6$ | 8 |
| $K_3Fe(CN)_6$ | 2.0 |
| $Na_4(SiMo_{12}O_{40})$ | 0.5 |
| Water, to make 1 liter. | |

FORMULA XV

| | Grams |
|---|---|
| $CrO_3$ | 6 |
| $NaBF_4$ | 15 |
| $K_3Fe(CN)_6$ | 1.5 |
| $H_4(SiMo_{12}O_{40})$ | 1.0 |
| Water, to make 1 liter. | |

FORMULA XVI

| | Grams |
|---|---|
| $CrO_3$ | 6 |
| HF | 1.5 |
| $K_3Fe(CN)_6$ | 0.5 |
| $Na_3(P_2Mo_{12}O_{41})$ | 1.5 |
| Water, to make 1 liter. | |

FORMULA XVII

| | Grams |
|---|---|
| $CrO_3$ | 6 |
| $NaHF_2$ | 2.5 |
| $K_3Fe(CN)_6$ | 0.5 |
| $Na_6(PMo_{18}O_{62})$ | 2.0 |
| Water, to make 1 liter. | |

Additional examples are presented to show further embodiments of the present invention wherein various heteropolymolybdenum compounds are employed in different coating solutions of the general types heretofore described.

FORMULA XVIII

| | Grams |
|---|---|
| $CrO_3$ | 5 |
| $Na_2SiF_6$ | 5 |
| $H_4(SiMo_{12}O_{40})$ | 3 |
| Water, to make 1 liter. | |

FORMULA XIX

| | Grams |
|---|---|
| $CrO_3$ | 7.5 |
| NaF | 1.5 |
| $Na_4(SiMo_{12}O_{40})$ | 2 |
| Water, to make 1 liter. | |

FORMULA XX

| | Grams |
|---|---|
| $CrO_3$ | 5 |
| $KHF_2$ | 1 |
| $Na_3(P_2Mo_{12}O_{41})$ | 2 |
| Water, to make 1 liter. | |

In carrying out the process of the present invention the aluminum surfaces should first be cleaned. This step, in itself, forms no part of the invention and may be performed by any conventional cleaning procedure. For example, the aluminum article or surface to be coated may be dipped or otherwise brought into contact with a mild alkaline cleaner or treated with an emulsion of a grease solvent. The cleaned work, either wet or dry, may then be subjected to the action of a solution or bath prepared in accordance with the present invention. The baths of the present invention, as described above, are aqueous acid solutions containing as their essential coating producing ingredients hexavalent chromium ions, a fluorine bearing compound and a heteropolymolybdic acid or salt thereof and the baths may also contain a ferricyanide salt if such be desired.

The treatment may be made by immersing the surface to be coated in the solution or by flowing or spraying the solution over the work and after the treatment is completed the article may be rinsed with clean water and dried. If preferred, the rinsing solution may comprise a dilute solution of the coating bath per se, although this is not an essential of the invention. After rinsing and drying, the coated article may be used as is or a final siccative finish may be applied if so desired.

In preparing and replenishing a coating bath according to the present invention we have found that the following composition is a particularly useful one:

FORMULA XXI

| | Percent |
|---|---|
| $CrO_3$ | 68.4 |
| NaF | 13.4 |
| $Na_4(SiMo_{12}O_{40})$ | 18.2 |

The foregoing is a typical dry powder admixture and from about 0.4 to about 5 ounces per gallon of such an admixture may be used in preparing a coating solution according to the present invention. However, as is clear from the various formulas given, a dry admixture of this kind can be prepared and usefully employed with varying proportions of the ingredients given. For instance, various ratios of hexavalent chromium and a fluorine bearing compound may be employed just so long as they are capable of coating aluminum in accordance with the knowledge of the art, and the soluble heteropolymolybdic compound which is included as an addition agent may vary over a wide range in accordance with the teachings given above.

In view of the fact that the quantities of hexavalent chromium and of fluorine bearing compound may vary over a considerable range in accordance with the knowledge of the art and since it is possible also to vary the quantity of soluble heteropolymolybdic compound which is used therewith, it is quite practical to formulate dry admixtures for use in preparing and replenishing coating baths according to the present invention which fall within the limits given in the following formula:

FORMULA XXII

| | Percent |
|---|---|
| Hexavalent chromium | 60 to 75 |
| Fluorine bearing compound | 8 to 20 |
| Soluble heteropolymolybdic compound | 4 to 20 |

I claim:

1. In the art of producing a chromate conversion coating on aluminum by treating the surface thereof with an aqueous acid solution of the type chosen from the class consisting of hexavalent chromium and a fluorine bearing compound as one group, and of hexavalent chromium, a fluorine bearing compound and ferricyanide as a second group, in proportions capable of producing such a coating; the method which comprises including in such a solution, as an addition agent, a compound selected from the class which consists of phospho and silico polymolybdic acids, and soluble salts thereof.

2. The method of claim 1 wherein the solution contains from 0.04 to 8.0 grams/liter (weight/volume) of the addition agent.

3. An aqueous acid aluminum coating solution of the type wherein the coating producing ingredients consist essentially of hexavalent chromium and a fluorine bearing compound in proportions capable of producing a chromate conversion coating on the aluminum; containing, as an addition agent, a compound selected from the class which consists of phospho and silico polymolybdic acids, and soluble salts thereof, the quantity of said addition agent being from 0.04 gm./ltr. (wt./vol.) to saturation.

4. A solution according to claim 3 which also includes ferricyanide.

5. An admixture for use in preparing and replenishing a coating solution according to claim 3, said admixture containing the following:

| | Percent |
|---|---|
| Hexavalent chromium | 68.4 |
| Fluorine bearing compound | 13.4 |
| $Na_4(SiMo_{12}O_{40})$ | 18.2 |

6. A composition for use in the production of a chromate conversion coating on aluminum, the coating-producing ingredients of which composition are chosen from the class consisting of hexavalent chromium and a fluorine bearing compound as one group; and of hexavalent chromium, a fluorine bearing compound and ferricyanide as a second group; the ratio of ingredients in each group being capable of producing a chromate conversion coating on aluminum; and said composition containing, as an addition agent, a compound selected from the class which consists of phospho and silico polymolybdic acids, and soluble salts thereof.

References Cited in the file of this patent

UNITED STATES PATENTS

| 2,796,371 | Ostrander et al. | June 18, 1957 |
| 2,839,439 | Stapleton | June 17, 1958 |
| 2,868,679 | Pimbley | Jan. 13, 1959 |

UNITED STATES PATENT OFFICE

CERTIFICATE OF CORRECTION

Patent No. 3,009,842                  November 21, 1961

Lester Steinbrecher

It is hereby certified that error appears in the above numbered patent requiring correction and that the said Letters Patent should read as corrected below.

Column 2, line 1, for "$[Na_6(PMo_{18}O_6']$" read -- $[Na_6(PMo_{18}O_{62})]$ --; line 4, for "$[Na-(SiMo_{12}O_{40})]$" read -- $[Na_4(SiMo_{12}O_{40})]$ --.

Signed and sealed this 24th day of April 1962.

(SEAL)
Attest:

ESTON G. JOHNSON                      DAVID L. LADD
Attesting Officer                      Commissioner of Patents